May 1, 1956     J. N. SNOW ET AL     2,743,759

METHOD OF MAKING A CORRUGATED FABRIC DUCT

Filed Nov. 1, 1954

United States Patent Office 2,743,759
Patented May 1, 1956

2,743,759
METHOD OF MAKING A CORRUGATED FABRIC DUCT

Jack Norman Snow, Downey, Fred Alton Greenwald, South Gate, and William Charles Ticknor, Whittier, Calif., assignors, by mesne assignments, to National Motor Bearing Co., Inc., Redwood City, Calif., a corporation of California Application November 1, 1954, Serial No. 466,012

17 Claims. (Cl. 154—8)

This invention relates to flexible ducting and more particularly to a unique mode of making the same at low cost and more easily and expeditiously than heretofore.

It is well known that convolutions are advantageous in imparting flexibility to hose or ducting. And this is true whether sheet metal, fabric or sheeting of any character is employed for the casing. However, the techniques heretofore employed to fabricate convoluted ducting have varied greatly. While some have provided a fairly satisfactory product, all have been quite unsatisfactory from various aspects. Most if not all of the prior manufacturing methods have required complex and costly equipment which is time-consuming to operate and restricted to the manufacture of a specific size of hose by a given piece of equipment.

According to one commonly used prior method, convoluted or corrugated ducting has been produced by the use of complicated expanding mandrels having alternately arranged relatively flexible and non-flexible sections capable of being deformed by fluid pressure beneath the carcass of the hose to produce the troughs and ridges required to impart flexibility to the ducting. Obviously, the mandrel must be made with great care and uniformity as otherwise any slightly weak section will expand excessively producing unacceptable ducting. Furthermore, such a mandrel is not readily adaptable to the manufacture of ducting of differing lengths, nor of corrugated sections of varying lengths within a given length of ducting.

According to still another method widely used heretofore, reliance is placed on a wire helix surrounding or embedded in the body of the carcass to form the valleys of the convolutions as the portions between the turns of the helix are expanded under internal fluid pressure to form the ridges. This method likewise has many disadvantages including greater cost for both materials and fabrication. Also, the presence of the wire coil in the finished product is often objectional as providing both a heat and electrical conducting path. And of course the wire adds materially to the weight and the difficulty of handling the hose.

Therefore, it is a primary object of this invention to provide a new and greatly simplified mode of producing flexible ducting which completely circumvents the undesirable aspects of prior methods and of the product produced thereby.

Another object is the provision of a new method of manufacturing ducting requiring only the simplest and most rudimentary manufacturing aids such as a rotatable mandrel, a source of fluid pressure and a heat source.

Yet another object is a mode of making ducting having hills and valleys to impart marked flexibility thereto without reliance on locked-in reinforcing means such as metal rings or a wire helix.

A further object is the provision of a new method of making flexible fabric ducting by the temporary use of fluid pressure and readily handled restraining means in the form of thonging of either the flexible or rigid type.

Still another object is the provision of a flexible duct made of fabric coated with a curable plastic, resinous or elastomeric coating or impregnating agent capable of rendering the finished product impervious and imparting a predetermined configuration thereto, and prepared in such manner as to have hills and valleys formed by the walls thereof without resort to a locked-in reinforcing means. Thus, the present method provides a flexible duct in which the valleys as well as the hills tend to retain their shape by the cooperative action of the pre-formed fabric and the cured impregnating agent therein.

A further object is the provision of a method of making convoluted ducting of uniform character rapidly and inexpensively from strip fabric impregnated with a heat curable sealing agent.

Yet another object is the provision of a new and improved method of making a series of flexible couplings in a single length of ducting and thereafter severing the couplings from one another.

Figure 1:
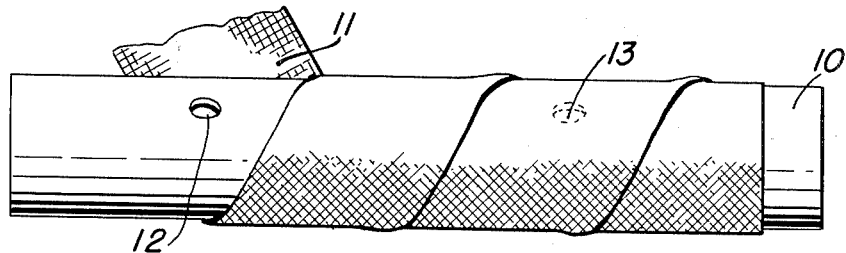
Figure 1 illustrates a first step in this method which involves the application of a spiral fabric wrapping to a mandrel.

Referring now to the drawings and more particularly to Figure 1, it will be seen that 10 designates a cylindrical mandrel on which a strip of suitable fabric 11 is being wound spirally. Preferably, the adjacent edges of the strip overlap sufficiently to provide a fluid-tight joint. It will be observed that the warp threads of the fabric extend lengthwise of the strip and parallel to its edges. Preferably, the width of the strip 11 is such that the woof and warp threads make an angle between 35° and 55° with respect to the axis of the duct since this results in a finished duct of maximum flexibility and strength. While Figure 1 shows but a single strip or layer of fabric being applied to the mandrel, it is to be understood that the duct may comprise one or a plurality of layers depending upon the use to which the duct is to be put, and the strength and wearing qualities required for a given application. If more than one layer is employed, the seams may be of the lap type illustrated in Figure 1 or the edges of adjacent turns may directly abut one another to form a butt seam. In the latter event, care should be exercised to avoid having the joints of adjacent layers coincide with one another.

It should also be pointed out that it is desirable to precoat the mandrel with a suitable release agent before winding the fabric onto it. A variety of release agents may be employed, although best results will be obtained by selecting certain types depending upon the particular impregnating agent used. The common rubber elastomers are used most successfully with a release agent of the mica, talc, graphite or silicone type. Where silicone elastomer is used as the impregnating agent, the mandrel may be initially coated with a film of mineral oil, wax, a detergent, or a soap such as sodium lauryl sulfate.

Preferably, the strip material is impregnated with uncured or semi-cured thermosetting plastic or elastomeric rubber material. If the ducting is to be used for high temperature applications, then it is desirable to use Fiberglas fabric impregnated with either neoprene or silicone elastomer. Moreover, if the ducting comprises more than one layer, it is often desirable to apply a coating of uncured elastomeric paste to the exterior of the inner layer before applying the next layer. This same operation is employed for each additional layer if more than two are applied.

After the carcass has been prepared as described above, the next operation is to apply the thonging material generally indicated at 14. While any suitable high-strength material of either the rigid or flexible type may be used, we have found that Fiberglas cording is particularly advantageous because of its high strength, negligible expansion, and the ease and speed with which it may be put in place and removed. However, other materials may be readily substituted. For example, wire thonging is a particularly suitable material since it may be pre-formed as a helix and telescoped over one end of the carcass. After the curing operation, it is easily removed by unthreading it from the convoluted duct. Whatever thonging material is used, it is important that the turns be suitably spaced from one another and that at least one and preferably both ends be firmly anchored against both axial displacement and radial expansion relative to the duct.

Figure 3:
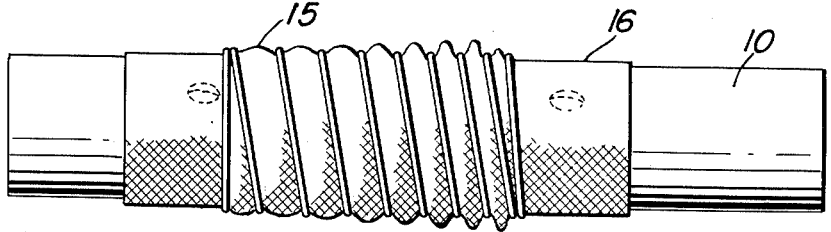
Figure 3 shows the next step in the method involving the application of fluid pressure to the space between the mandrel and the carcass to form a spiral convolution.

The next step is to apply fluid pressure to the space between the mandrel and the interior of the ducting. Fluid pressure may be applied to the interior of the ducting by inserting an air nozzle beneath one end of the carcass, or by connecting a source of pressurized air to the interior of hollow mandrel 10. In this event, one or more air outlet openings, as indicated at 12 and 13 in Figure 1, extend through the wall of the mandrel to points beneath the carcass of the duct. If the ducting is long, it is preferable to clamp one end to the mandrel by a clamp or a simple tourniquet. Some air, of course, escapes from the unsecured end of the hose, but not in sufficient quantity to interfere with the maintenance of the necessary air pressure within the section to be convoluted. The air pressure expands the fabric in the area between the turns of the thonging 14 to form a spiral convolution 15. As the unthonged areas of the wall expand radially, the operator pushes the free right-hand end of the ducting axially toward the left as indicated in Figure 3; or if both ends are left unclamped, the operator shifts the ends toward one another along the mandrel.

The free ends or end of the duct are then tightly secured to the mandrel by clamping or tying, and the ducting is subjected to heat at a temperature suitable for curing the particular impregnating agent employed. If silicone elastomer has been used, the initial cure is carried out at a temperature of 250° F. or higher for a period of 15 to 45 minutes depending on the temperature employed. Thereafter, the semi-cured duct is removed from the mandrel and further cured at 300° to 400° F. for 10 to 20 hours. If natural or butadiene elastomer has been employed, the curing operation can be carried out in 10 to 30 minutes at a temperature of 240° F. If other impregnating agents are adopted, then the curing periods and temperatures required for the particular agent should be used.

Of course, other impregnating and bonding agents may be employed in addition to those specifically mentioned above such as a thermosetting resin or other suitable plastic material. Natural or synthetic rubbers can also be used including neoprene, GRS and perbunan rubbers. Silicone and polysiloxane should be selected where the flexibility of the duct over a wide temperature range is required as, for example, in aircraft applications where very low and very high temperatures are commonplace.

Figure 4:
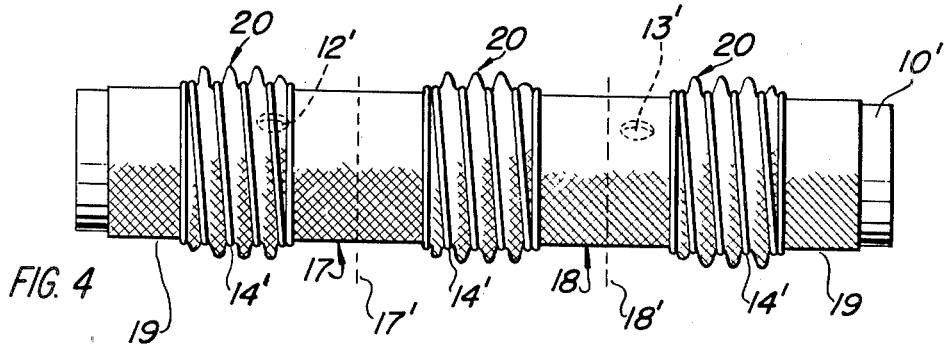
Figure 4 illustrates the formation of several convoluted couplings from a single piece of ducting and separate pieces of wire thonging.

Reference will now be had to Figure 4 illustrating the simple manner in which several convoluted couplings can be formed simultaneously from a single piece of ducting. The duct carcass may be formed on a hollow mandrel 10' in the same manner described above. Thereafter, separate pieces of thonging 14', 14' are applied to the ducting at spaced intervals in order to make as many couplings as there are thonged sections 20, 20. The length of any thonged section of course determines the length of the finished coupling. Obviously, each coupling may be of the same length as illustrated, or each may differ in length if desired. The cylindrical sections interconnecting the thonged sections as indicated at 17, 18 and 19 are tightly wrapped with tape or other binding to prevent them from expanding when pressure is applied to the interior of the duct to form the convolutions, as later they are to serve as clamping sleeves of the required length for connection to other ducting or tubing.

Figure 2:
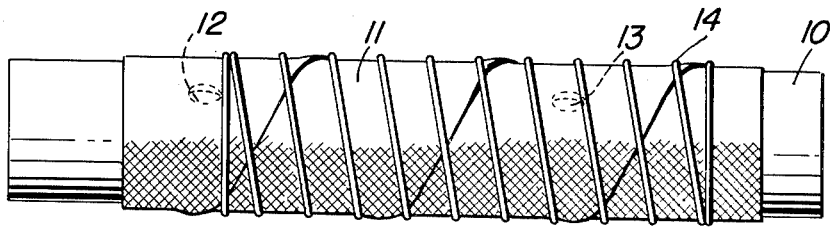
Figure 2 shows a pre-formed wire thonging telescoped over one end of the carcass formed in Figure 1.

Air under pressure can now be applied to the ducting as the opposite ends of the ducting are pushed toward one another axially of the mandrel. This fluid pressure, together with the axial contraction of the ducting, causes the unrestrained areas between the turns of thonging 14' to bulge outwardly to form bellows-like sections in the same manner described above in connection with Figures 1 to 3. The uncured or semi-cured impregnating agent already present in the fabric stripping, or applied as a coating during the formation of the carcass, may now be cured. As was true of the first embodiment, this curing operation can be carried out while maintaining the fluid pressure on the ducting, or the fluid pressure may be released partially or completely before the curing operation is commenced. Once the impregnating agent has been cured, the convolutes readily retain their shape and position without the aid of the thonging. Consequently, the thonging may be removed. In other instances, it may be desirable to leave the thonging in place and this is particularly true where the coupling is to be used as an elbow.

The mandrel is now removed and the individual coupling sections are formed by severing the ducting intermediate the ends of the cylindrical sections as along planes 17', 18'.

While only two embodiments of the invention have been specifically described above, it will be readily appreciated that many variations may be adopted without departing from the essential principles of our invention. Although we have described the carcass as formed from one or more layers of spirally wound stripping having overlapping edges secured together by cementing or by the impregnating agent, it will be obvious that the carcass may be formed in other manners so long as the individual threads of the fabric used in making the carcass lie at an angle of 35 to 55° with respect to the axis of the completed duct. The curing operation may be carried out in an open room or in an oven, autoclave, or other suitable facility for applying the required curing temperatures. If the curing is done in an open room, the heat may be supplied by batteries of infra-red lamps. Steam or hot air may also be used as the source of heat.

It will also be manifest that the flexibility may be obtained by separate and distinct corrugations arranged in an integral series instead of by means of a continuous spiral convolute. If bellows-like corrugations are desired, these may be formed by tying the carcass by individual rings of cord or thonging at regularly spaced intervals and then expanding the intervening space in the same manner described above. After the corrugations have been formed and set by the curing operation, the individual rings may be severed and removed.

While the foregoing description and drawings refer to the mandrel as smooth and circular, it will be readily apparent that it may have any cross-section suitable for ducting. Furthermore, the surface need not be smooth, nor need the mandrel be hollow. Thus, narrow grooves formed in the surface and extending lengthwise or circumferentially, as in a spiral or otherwise, would serve to distribute the pressurized air quickly thereby obviating the need for a hollow or a perforated mandrel.

What we claim is:

1. The method of making flexible corrugated fabric ducts comprising the following steps: forming a generally cylindrical tube by spirally wrapping a rectangularly-woven elastomer-impregnated fabric on a rigid generally cylindrical mandrel; spirally winding a non-expansible filament around the fabric at a substantially constant pitch and securing the ends of said filament to said tube so as to prevent displacement thereof relative to said tube; introducing gas under pressure between said fabric tube and said mandrel to loosen said tube from said mandrel and to force out away from said mandrel the portions of said tube that lie between successive turns of said filament; moving one end of said tube longitudinally toward its other end to produce a substantially uniform spiral corrugation in said fabric with the filament lying in the trough thereof; and curing the elastomer in the corrugated tube.

2. The method of making flexible ducts as defined in claim 1 including the step of removing said filament from the valley of said corrugation after said duct has been cured.

3. The method of making flexible corrugated fabric ducts, comprising the following steps: wrapping an elastomer-impregnated fabric on a mandrel of fixed length to form the fabric into a tube; spirally winding a filament around said tube, at a substantially constant pitch; introducing fluid between said tube and said mandrel to force outwardly the portions of said tube that lie between the portions held in by the filament; moving at least one end of said tube longitudinally toward the opposite end thereof to produce a substantially uniform spiral corrugation in said tube; and curing the corrugated tube.

4. The method of claim 3 in which the fluid is injected radially outward from within said mandrel.

5. The method of claim 3 in which the fluid is injected at one end of said tube between said tube and said mandrel.

6. The method of claim 3 in which the fabric is rectangularly woven and is wound on said mandrel at an angle between 35° and 55° with respect to the axis of said mandrel, so that the resultant fabric tube is perpendicular with respect to the axis of said mandrel that permits expansion of the tube between the windings of said filament.

7. The method of claim 3 in which said elastomer is sufficiently pre-cured on the inner face of said fabric before said fabric is applied to said mandrel to avoid adhesion between the mandrel and the fabric.

8. A method of making a flexible fabric duct comprising the steps of impregnating a woven fabric with an uncured elastomer; winding said impregnating fabric on a mandrel so that the weave is on a bias with respect to the axis of said mandrel; spirally winding a retaining filament helically about said fabric so that the successive turns are spaced apart at substantially regular intervals; applying fluid pressure between said mandrel and said fabric while longitudinally compressing a section of said fabric by bringing the two ends of the section nearer in toward each other to form convolutions between said windings; clamping an adjacent section of said fabric to said mandrel to prevent the formation of convolutions within a restricted area; compressing the next adjacent section of said fabric by bringing the two ends of that section in toward each other to form another convoluted section; and proceeding thence to form the desired number of convoluted sections in said duct; and thereafter curing said elastomer to retain said convolutions in permanent form.

9. The method of making a helically convoluted flexible duct which comprises winding a retaining filament helically around a tube of an uncured elastomer supported on a mandrel; expanding convolutions in said tube by applying fluid pressure to the inside of said tube; compressing the tube longitudinally to about half its length and then curing said elastomer while said convolutions are maintained in position by said filament.

10. The method of making corrugated fabric ducts as defined in claim 9 which includes removing said helix from said corrugated tube after the same has been cured.

11. That method of making a corrugated fabric duct which comprises wrapping a strip of fabric coated with uncured elastomer in a manner to form a straight tube closed except at its opposite ends, temporarily placing a high strength filament about the exterior of said tube in a spiral path of uniform pitch and closely adjacent the exterior of said tube, anchoring the opposite ends of said filament against contraction axially of said tube, subjecting the interior of said tube to fluid pressure to expand the walls thereof outwardly in the area between adjacent turns of said spirally arranged filament as said tube contracts axially to form a spiral corrugation therealong, and subjecting said corrugated tube to a curing operation for said elastomer.

12. That method of making a corrugated duct defined in claim 11 including the step of removing said filament after said elastomer has been cured.

13. That method of making a corrugated fabric duct which comprises spirally wrapping a narrow strip of fabric about a straight axis to form a tube open only at its opposite ends, temporarily placing a helically formed filament about the exterior of said tube and closely adjacent the surface thereof throughout a substantial portion of the tube's length with the individual turns of said helix uniformly spaced, anchoring the opposite ends of said helix against movement axially of said tube, coating said fabric with a fluid which sets and becomes solid when subjected to heat, imposing a fluid pressure on the interior walls of said tube to expand the area thereof between the turns of said helix outwardly as said tube is allowed to contract axially to form a corrugation extending lengthwise thereof with said helix lying in the valley of the corrugation, and subjecting said corrugated tube to heat until said fluid coating sets and acts to hold said fabric tube permanently in the aforesaid corrugated shape.

14. That method of corrugating a flexible walled duct of fabric material impervious to fluids which comprises encircling the duct with a cord-like filament arranged spirally and uniformly along a section of the duct, anchoring the ends of said filament to hold the same in place uniformly along said section of the duct, subjecting the interior of said duct to fluid pressure while allowing the filament encircled portion of said duct to contract axially as the fluid pressure cooperates with said filament in forming a spiral corrugation therealong with said filament located in the valley of the corrugation, applying an uncured elastomeric coating to at least one surface of said duct, and curing said corrugated duct by subjecting the same to heat.

15. That method of corrugating a flexible walled duct as defined in claim 14 which includes as a final step the removal of said filament.

16. That method of corrugating a flexible walled duct as defined in claim 14 in which said filament comprises metal wire and wherein said wire is removed after the completion of said curing step.

17. That method of making a flexible walled duct which comprises supporting a tubular duct made of fabric material impregnated with an incompletely cured elastomer to render the same self-supporting against collapse, encircling said duct with axially spaced thonging capable of retaining the portions of said duct immediately underlying said thonging against radial expansion when pressure is applied to the interior of said duct, anchoring the ends of said thonging, radially expanding the portions of said ducting not restrained by said thonging to form circumferentially extending bulges in said ducting as the ducting is permitted to contract axially of itself, and curing said elastomer by subjecting said ducting to heat while the latter is restrained in said axially contracted position.

References Cited in the file of this patent

UNITED STATES PATENTS

| 2,392,992 | Martin | Jan. 15, 1946 |
| 2,584,501 | Roberts | Feb. 5, 1952 |
| 2,609,002 | Meissner | Sept. 2, 1952 |